United States Patent
Khosravani et al.

(10) Patent No.: US 6,603,890 B2
(45) Date of Patent: Aug. 5, 2003

(54) COMPENSATION FOR POLARIZATION-MODE DISPERSION IN MULTIPLE WAVELENGTH-DIVISION MULTIPLEXED CHANNELS WITHOUT SEPARATE COMPOSITION FOR EACH INDIVIDUAL CHANNEL

(75) Inventors: Reza Khosravani, Lakewood, CA (US); Steven A. Havstad, Lakewood, CA (US); Yong-Won Song, Los Angeles, CA (US); Paniz Ebrahimi, Los Angeles, CA (US); Alan E. Willner, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 57 days.

(21) Appl. No.: 09/800,761

(22) Filed: Mar. 6, 2001

(65) Prior Publication Data

US 2001/0055437 A1 Dec. 27, 2001

Related U.S. Application Data

(60) Provisional application No. 60/187,126, filed on Mar. 6, 2000.

(51) Int. Cl.[7] .................................................. G02B 6/00
(52) U.S. Cl. ........................ 385/11; 385/24; 385/27; 385/122
(58) Field of Search ............................ 385/11, 24, 123, 385/27; 359/122, 154, 156

(56) References Cited

U.S. PATENT DOCUMENTS

| | | | |
|---|---|---|---|
| 5,473,457 A | | 12/1995 | Ono |
| 5,859,939 A | * | 1/1999 | Fee et al. ...................... 385/24 |
| 5,930,414 A | * | 7/1999 | Fishman et al. ............... 385/11 |
| 5,949,560 A | | 9/1999 | Roberts et al. |
| 6,317,240 B1 | | 11/2001 | Penninckx |
| 6,330,375 B1 | * | 12/2001 | Fishman et al. ............... 385/11 |
| 6,339,489 B1 | * | 1/2002 | Bruyere et al. ............. 359/156 |
| 6,459,830 B1 | | 10/2002 | Pua |

* cited by examiner

*Primary Examiner*—Robert H. Kim
*Assistant Examiner*—Michael H Caley
(74) *Attorney, Agent, or Firm*—Fish & Richardson P.C.

(57) ABSTRACT

Techniques for compensating for PMD in multiple WDM channels by processing all WDM channels in the same manner without demultpliexing the channels. A feedback control is provided to decrease the worst-case power penalty and the channel fading probability by optimizing over the entire group of WDM channels.

18 Claims, 5 Drawing Sheets

COMPENSATION FOR POLARIZATION-MODE DISPERSION IN MULTIPLE WAVELENGTH-DIVISION MULTIPLEXED CHANNELS WITHOUT SEPARATE COMPOSITION FOR EACH INDIVIDUAL CHANNEL

This application claims the benefit of U.S. Provisional Application No. 60/187,126, filed on Mar. 6, 2000.

BACKGROUND

This application relates to compensation for optical dispersion, and more specifically, to techniques for reducing polarization-mode dispersion in optical media such as optical fiber links in optical wavelength-division multiplexing (WDM) systems.

Some optical transmission media such as optical fibers are birefringent and hence exhibit different refractive indices for light with different polarizations along two orthogonal principal directions. Therefore, an optical signal, that comprises two components along the two orthogonal principal directions for each frequency, can be distorted after propagation through the transmission medium since the two components propagate in different group velocities. This optical dispersion is generally referred to as polarization-mode dispersion ("PMD").

The degree of PMD may be approximately characterized by the average differential group delay ("DGD") between two principal states of polarization. Typical causes for such birefringence in fibers include, among others, imperfect circular core and unbalanced stress in a fiber along different transverse directions. The axis of birefringence of the optical fiber can change randomly on a time scale that varies between milliseconds and hours, depending on the external conditions. Thus, the DGD in an actual PMD fiber is not a fixed value but a random variable that has a Maxwellian probability density function.

Such polarization-mode dispersion is undesirable in part because the pulse broadening can limit the transmission bit rate, the transmission bandwidth, and other performance factors of an optical communication system. In fact, PMD is one of key limitations to the performance of some high-speed optical fiber communication systems at or above 10 Gbits/s per channel due to the fiber birefringence. Fibers with significant PMD (e.g., about 1 to 10 ps/km$^{1/2}$) are used in various fiber networks, particularly in those that were deployed in 1980's and early 1990's.

SUMMARY

The present disclosure includes PMD compensation in WDM systems without wavelength demultiplexing. All WDM channels are guided through the same optical path in a PMD compensation module. The overall system performance can be improved by reducing the fading probability for one or more worst-performing channels at any given time.

One embodiment of a PMD compensation system includes a PMD compensator and a feedback control that produces a control signal for controlling the PMD compensator. The PMD compensator guides a plurality of WDM optical channels through a common optical path to modify a differential group delay (DGD) in each channel. The PMD compensator is operable to adjust the DGD in response to the control signal. The feedback control is coupled to measure a property of the channels as a whole and operable to generate the control signal according to the measured property.

DETAILED DESCRIPTION

The techniques for PMD compensation described in this disclosure are in part based on the recognition that, the high DGD values in the distribution tail of the DGD Maxwellian probability density function may have significant and adverse impact on the signal degradation even though the probabilities for such high DGD values to occur are low. Hence, it is desirable to design a PMD compensation scheme capable of reducing the impact of such high DGD values with low probabilities. In addition, as an alternative to compensation for the PMD in each individual WDM channel, the overall effects of PMD on multiple WDM channels may be reduced by processing the multiple WDM channels as a whole. This compensation scheme may be used to reduce the device complexity and cost for the PMD compensation.

In principle, an ideal multiple-channel first-order PMD compensator would generate PMD vectors opposite to the PMD vectors of the transmission fiber at each channel wavelength. In the low-PMD regime where the average DGD in the transmission link is low, the correlation bandwidth of PMD vectors for different WDM channels is approximately inversely proportional to the amplitude of the PMD vector and is greater than the channel spacing. Hence, the PMD vectors on the Poincaré sphere for different WDM channels are correlated. Under this condition, different WDM channels may be treated equally in an appropriate PMD compensation scheme to effectively compensate for the PMD in different WDM channels at the same time.

In the high-PMD regime where the correlation bandwidth of the PMD vectors is less than the WDM channel spacing, however, the PMD vectors of different WDM channels are independent from one another. Therefore, under the conventional wisdom, this appears to suggest that different WDM channels should be separately compensated. Some PMD compensation schemes follow this rational by using a WDM demultiplexer to first separate the different WDM channels and then using separate PMD compensators to respectively compensate for the PMD in different WDM channels. The PMD-compensated channels are then combined by a WDM multiplexer at the output. Such schemes may increase both structural complexity and the cost of the PMD compensation system.

The present disclosure goes beyond the conventional wisdom to teach that, different WDM channels may still be treated equally as a whole even in the high-PMD regime where the correlation bandwidth of the PMD vectors is less than the WDM channel spacing. This is in part based on the recognition that two or more WDM channels are not likely to be severely degraded by the PMD at any given time. Instead, statistically, the majority of the WDM channels at any given time are likely to be in the low-DGD regime. Techniques of this disclosure use one or more PMD compensators to equally process different WDM channels without channel discrimination by guiding each and every WDM channels through the same optical path. This approach can significantly decrease the worst-case power penalty and the channel fading probability by optimizing over the entire group of WDM channels although each WDM channel may still have some residue PMD.

In particular, a feedback control mechanism is used to monitor the degree of PMD degradation on the overall performance of the combined WDM channels by measuring a property of the combined WDM channels. Based this monitoring, the feedback control mechanism dynamically adjusts the one or more PMD compensators to reduce the PMD effect on the overall performance of the combined WDM channels.

Figure 1:
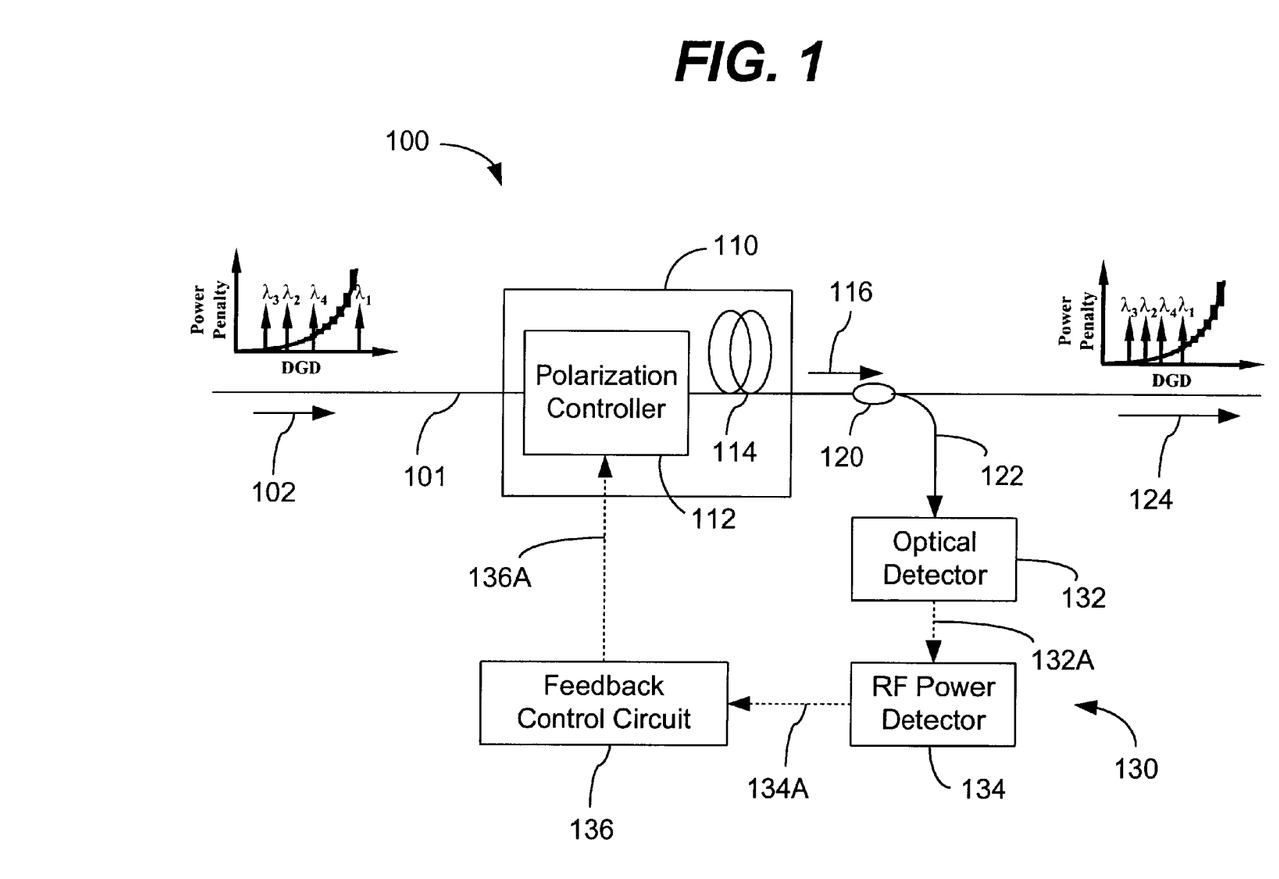
FIG. 1 shows a PMD compensation system based on one embodiment.

FIG. 1 shows one embodiment of a PMD compensation system 100. A fiber 101 is used to transport an input optical signal 102 with multiple WDM channels from an optical link with PMD. A PMD compensator 110 is coupled in the fiber 101 to receive and process the input optical signal 102 to produce a PMD-compensated signal 116. Notably, the PMD compensator 110 is designed to process the input signal 102 as a whole without distinguishing individual WDM channels. Hence, different WDM channels are not demultiplexed and separated within the PMD compensator 110 but are guided through the same optical path within the PMD compensator 110.

In the illustrated implementation, the PMD compensator 110 includes a polarization controller 112 and a polarization-maintaining (PM) fiber 114. The polarization controller 112 controls and adjusts the polarization of light so that its output signal has a particular polarization. In particular, the polarization controller 112 is operable to set its output polarization in any desired polarization state and may operate in response to an external control signal. Several implementations of such a polarization controller are well known. The PM fiber 114 is birefringent and has fixed orthogonal principal polarization axes. Hence, as the polarization controller 112 rotates the polarization of the input signal 102 relative to the principal polarization axes of the PM fiber 114, a delay between the two orthogonal polarizations can be introduced through propagation through the PM fiber 114 in each WDM channel.

The system 100 implements an optical coupler 120 in the fiber 101 to tap a small PMD monitor signal 122 from the signal 116. The remaining portion of the signal 116 is then sent out in the fiber 101 as the output signal 124. A PMD feedback control loop 130 is used to receive and process the PMD monitor signal 122 and to produce a control signal 136A for controlling the PMD compensator 110. In the example shown, the control signal 136A is used to control the operation of the polarization controller 112. This PMD feedback control loop 130 measures the degree of the total degradation of the combined WDM channels in the signal 116 at any given moment, and adjusts the amount of DGD it produces in the signal 116 to optimally decrease the DGD for the worst WDM channel. Hence, although each channel may have some residual PMD degradation, the probability of any of the channels being severely degraded by PMD can be significantly reduced. This technique may be used to significantly reduce the power-penalty distribution tail for each WDM channel and the probability of link outage.

One realization of the PMD feedback control loop 130 includes a single optical detector 132, a RF power detector 134, and a feedback control circuit 136. The optical detector 132 may be a high-speed detector capable of responding at the highest bit rate in the WDM channels to convert the optical monitor signal 122 into an electrical detector signal 132A. The detector signal 132A essentially replicates the optical modulations in the total optical power of the combined WDM channels in form of a modulated current or voltage. The RF power detector 134 receives the detector signal 132A and measures the electrical power associated with the signal 132A which is proportional to the square of the modulated current or voltage in the signal 132A. The RF power detector 134 then produces a signal 134A that is proportional to the measured AC electrical power of the detector signal 132A either in the entire frequency range or a selected frequency range Note that the DC portion of the measured electrical power could be removed by filtering 134. This signal 134A is then processed by the feedback control circuit 136 to produce the control signal 136A. This signal 136A is fed back to the polarization controller 112 to increase the detected RF power by adjusting the polarization of the PMD compensator 110. This feedback operation can improve or optimize the overall system performance and produce increased eye-openings for the WDM data streams in the output 124.

The RF power detector 134 may include one or more RF bandpass filters to filter the power signal in one or more frequency bands to generate one or more signals like the signal 134A. This technique could be used to increase the sensitivity of the feedback control to the PMD-induced signal variations in the input WDM channels because the power variation in the signal 134A in a particular frequency band may be more sensitive than power variations in other frequency bands. Alternatively, a tunable RF bandpass filter may be used in the power detector 134 to adjust the frequency band of the signal 134A to optimize the detection sensitivity. The feedback control circuit 136 selects one signal 134A or a combination of these signals that is most sensitive to the PMD variation to produce the control signal 136A.

Figure 2A:
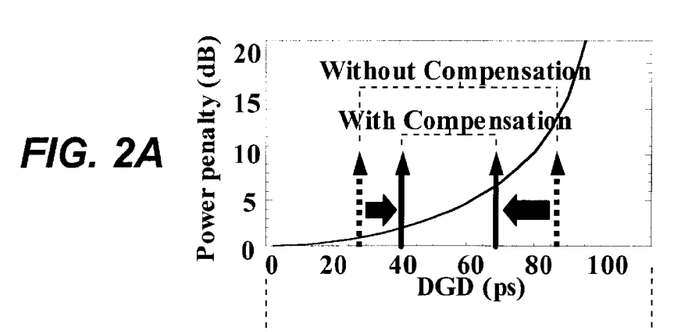
FIG. 2A shows simulation results of the power penalty through the system in FIG. 1.
Figure 2B:
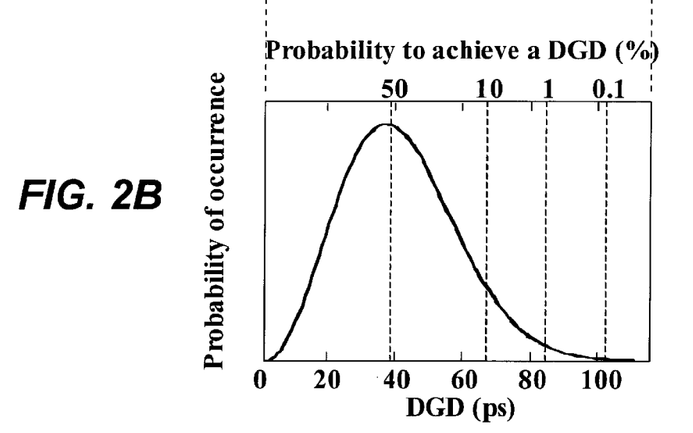
FIG. 2B shows the Maxwellian probability distribution for the differential group delay (DGD) in the input signal.

FIG. 2A shows simulation results of the power penalty corresponding to different DGD values. FIG. 2B shows the corresponding Maxwellian distribution in the input signal 102. The power penalty for small DGD values is small and may be negligible. The high DGD values generate significant power penalties. Additionally, the probability of a large DGD value is very small. Moreover, even if two channels both have a large DGD, the channels will be severely degraded only if the state-of-polarization of each channel is somewhat orthogonal to its own PMD vector. Therefore, it is highly unlikely that more than one channel will be severely degraded at any given time.

The compensation performance of the system 100 was demonstrated by operating on four equal-power WDM channels with a channel spacing of about 4 nm. A multi-section PMD emulator with rotatable connectors was used to produce a Maxwellian-distributed DGD with a PMD-vector autocorrelation function that closely resembles that of real fiber. The average DGD produced by the PMD emulator is about 42 ps. The PMD compensator 110 was implemented with an electrically-controlled single-section compensator which includes a polarization controller and a short length of PM fiber to produce 30 ps of DGD. The RF bandpass filter in the RF detector used for the measurements had a bandwidth of about 4 GHz from 4 GHz to 8 GHz.

Figure 3A:
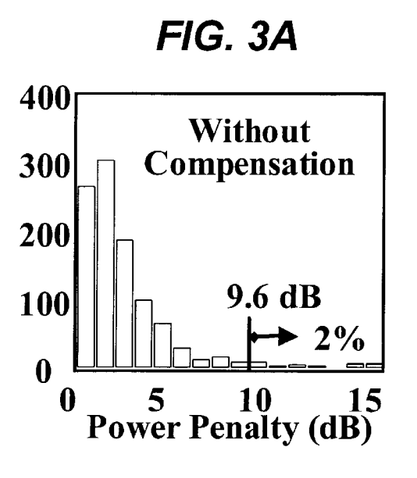
FIGS. 3A, 3B, and 4 show measured power penalty and eye diagram for four WDM channels with and without using a PMD compensation system based on the design in FIG. 1.
Figure 3B:
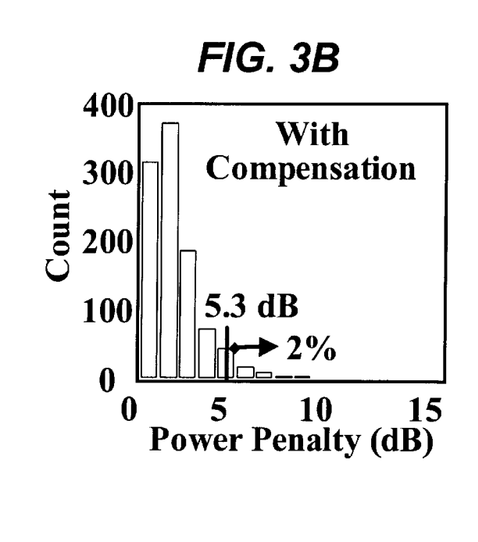

FIGS. 3A and 3B show the power penalty measurements for the combined four WDM channels by a total of 1000 independent measurements with 250 measurements per channel. Each independent measurement corresponds to a different emulator state. Simultaneous compensation of all WDM channels can reduce the probability of the highly-degraded tail events. For the combined WDM channels, the 2% worst case of the power penalty distribution tail for the channels is reduced from 9.6 dB to 5.3 dB.

Figure 4:
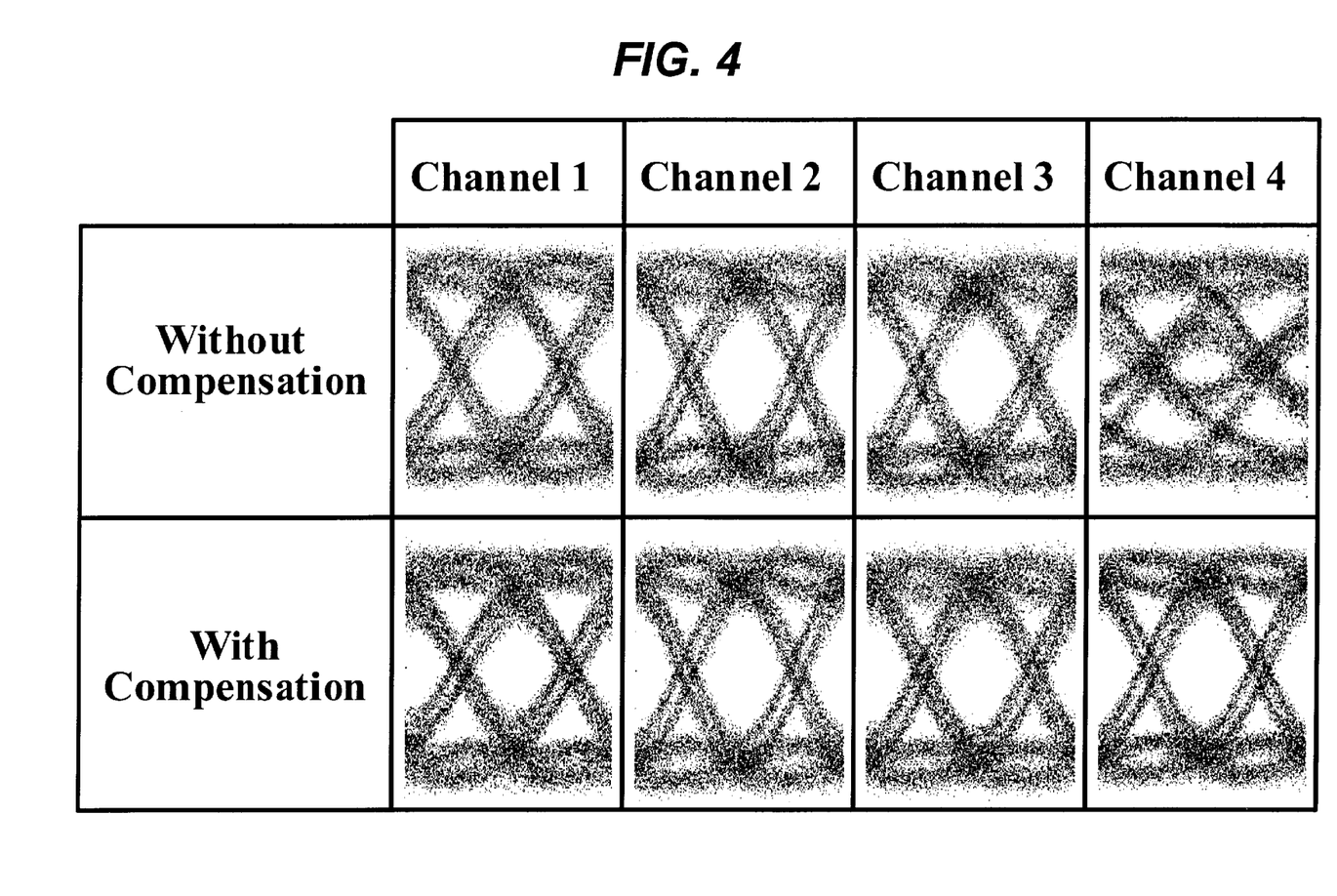

FIG. 4 shows one measurement of the eye diagram of the four channels before and after compensation. Channel 4, the most-degraded channel, is shown to improve significantly after compensation without impacting the other channels.

Figure 5:
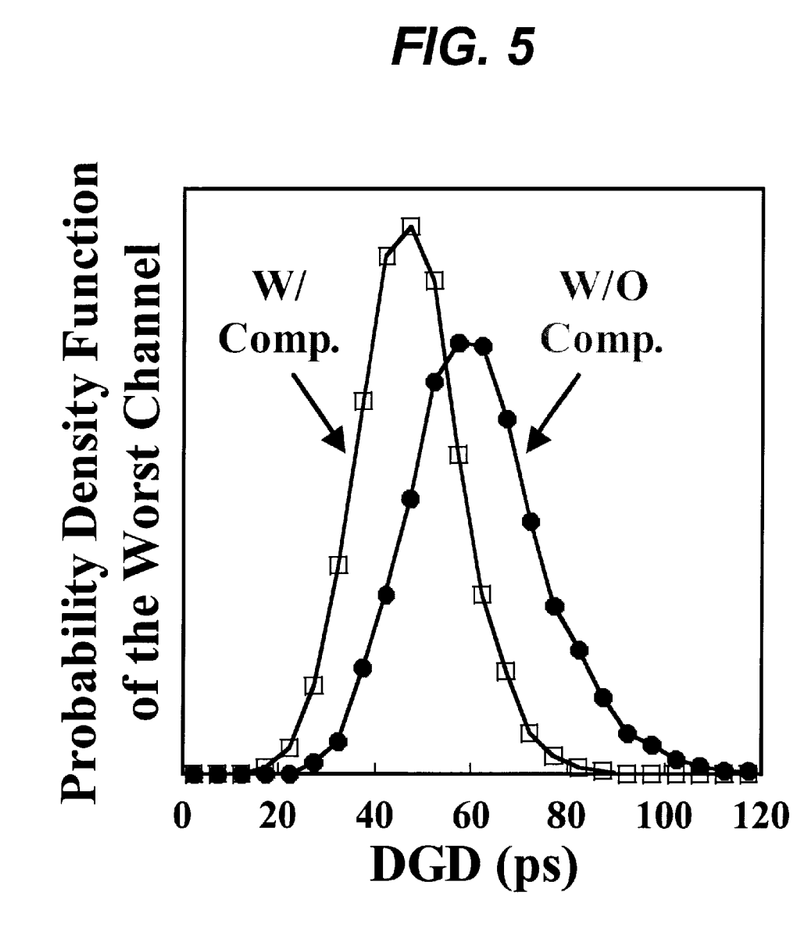
FIG. 5 compares the simulated probability density function for the channel with the worst DGD with and without the PMD compensation.

FIG. 5 shows the simulated DGD distribution of the worst channel in a four-channel WDM system with 25 ps average DGD with and without compensation. Four independent PMD vectors are simulated 200,000 times, and the distribution of the maximum length (DGD) of the four vectors is plotted as the DGD distribution for the worst channel in the uncompensated system. For the compensated system, a fixed 23-ps compensating PMD vector is used in an optimum position on the Poincaré sphere for each simulation to decrease the maximum length (DGD) PMD vector. The simulation indicates that, the DGD distribution of the worst channel has been improved on average. In addition, the tail of the distribution has been considerably reduced. The 0.01% tail of DGD distribution is reduced from 77 ps to 57 ps, which reduces the power penalty from 9.5 dB to 4.3 dB.

Figure 6:
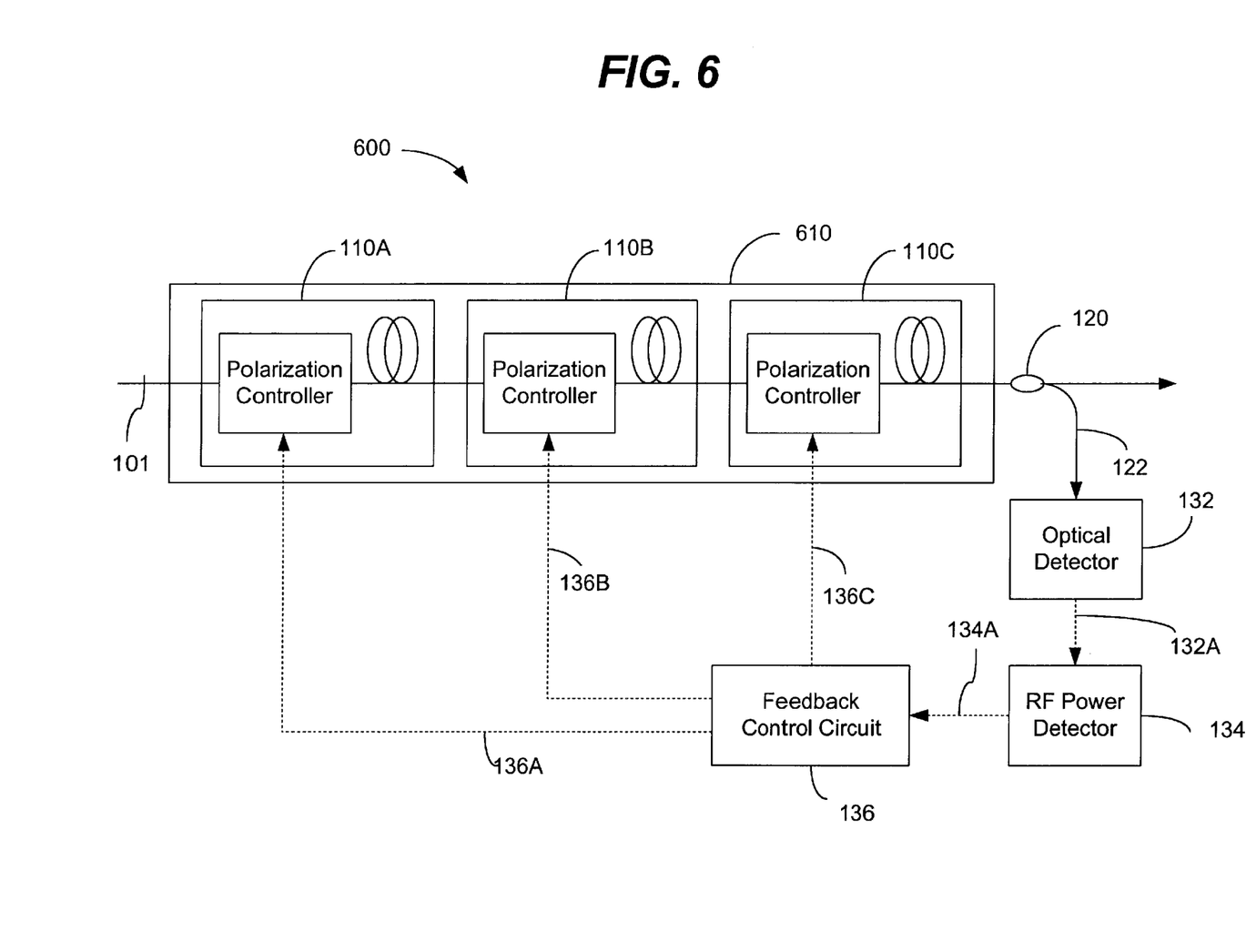
FIG. 6 shows another PMD compensation system with two or more adjustable PMD compensators.

The PMD compensation system 100 in FIG. 1 may be modified by having more than one pair of a polarization controller 112 and a PM fiber 114. This modification can be used to achieve additional freedom and flexibility in adjusting or optimizing the direction of the compensating PMD vector of the PMD compensator 110 on the Poincaré sphere and the length (DGD) of this compensating vector and hence further improve the compensation. FIG. 6 shows one PMD compensation system 600 with a PMD compensator 610 that has three adjustable pairs of polarization controller and PM fibers, 110A, 110B, and 110C. The feedback control 136 produces three control signals 136A, 136B, and 136 to control the three different polarization controllers, respectively. In general, as the number of the polarization controllers and the PM fiber sections increases, it is more likely to produce a resultant frequency-dependent PMD vector that could better compensate in the PMD in each WDM channel.

Although the present disclosure only includes a few embodiments, other modifications and enhancements may be made without departing from the following claims.

What is claimed is:

1. A system, comprising:
a polarization-mode dispersion (PMD) compensator operable to guide a plurality of wavelength-division multiplexed (WDM) optical channels through a common optical path to modify a differential group delay (DGD) in each channel, said PMD compensator operable to adjust said DGD in response to a control signal; and
a feedback control coupled to measure an AC electrical power proportional to the total optical power of said channels, and wherein the feedback control is further operable to generate said control signal to increase said AC electrical power.

2. The system as in claim 1, wherein said PMD compensator includes a polarization-maintaining fiber and a polarization controller, the polarization controller operable to adjust an output polarization in response to said control signal.

3. The system as in claim 1, wherein said PMD compensator includes a plurality of units connected in series, each unit including a polarization-maintaining fiber and a polarization controller, the polarization controller operable to adjust an output polarization in response to said control signal.

4. The system as in claim 1, wherein said feedback control includes:
an optical coupler disposed to couple a portion of an output signal from said PMD compensator that combines said channels;
an optical detector to convert said portion into an electrical signal having said AC power proportional to the total optical power of said channels;
an electrical power detector to detect said AC power; and
a control circuit to generate said control signal to increase said AC power.

5. The system as in claim 4, wherein said electrical power detector includes an electrical bandpass filter to select said AC power in a frequency band to increase response sensibility of said feedback control.

6. The system as in claim 4, wherein said electrical power detector includes at least two electrical bandpass filters with different frequency bands to select said AC power in one of said frequency bands to increase response sensibility of said feedback control.

7. A method, comprising:
directing each of a plurality of wavelength-division multiplexed (WDM) optical channels through a common optical path to modify a differential group delay (DGD) in each channel so as to produce an output with modified WDM channels;
measuring power of an AC portion of said output; and
modifying the DGD to increase said power.

8. The method as in claim 7, wherein said modifying the DGD includes adjusting a polarization of each channel relative to a principal axis of a polarization-maintaining fiber in said common optical path.

9. The method as in claim 7, further comprising:
filtering said power in frequency to select a portion of said power in a selected frequency band; and
wherein the DGD is modified to increase said portion in said selected frequency band.

10. The method as in claim 7, further comprising:
filtering said power in frequency to select a first portion of said power in a first selected frequency band;
filtering said power in frequency to select a second portion of said power in a second selected frequency band; and
selecting one of said first and said second portions to be increased by modifying the DGD.

11. The method as in claim 7, wherein said measuring said power of said AC portion of said output includes:
tapping an output of said common optical path to produce an optical monitor signal;
converting said optical monitor signal into an electrical signal;
measuring an AC electrical power of said electrical signal; and
filtering said AC electrical power in frequency to produce said AC portion.

12. The method as in claim 7, wherein said common optical path includes a first optical polarization controller and a first polarization-maintaining fiber, and wherein said first optical polarization controller is adjusted to modify the DGD.

13. The method as in claim 7, wherein said common optical path includes a plurality of pairs of a polarization controller and a polarization-maintaining fiber connected in series, wherein each optical polarization controller is adjusted to modify the DGD.

14. A system, comprising:

a polarization-mode dispersion (PMD) compensator operable to guide a plurality of wavelength-division multiplexed (WDM) optical channels through a common optical path to modify a differential group delay (DGD) in each channel, said common optical path comprising a plurality of adjustable units connected in series respectively operable to adjust the DGD in response to a plurality of control signals, respectively; and a feedback control coupled to measure an AC electrical power proportional to the total optical power of said channels after transmitting through said common optical path, and wherein the feedback control is further operable to generate said control signals to increase said AC electrical power.

15. The system as in claim 14, wherein each adjustable unit includes a polarization-maintaining fiber and a polarization controller, the polarization controller operable to adjust an output polarization in response to a respective control signal.

16. The system as in claim 14, wherein said feedback control includes:

an optical coupler disposed to couple a portion of an output signal from said PMD compensator that combines said channels;

an optical detector to convert said portion into an electrical signal having said AC power proportional to the total optical power of said channels;

an electrical power detector to detect the AC power; and a control circuit to generate said control signals to increase said AC power.

17. A method, comprising:

directing each of a plurality of wavelength-division multiplexed (WDM) optical channels through a common optical path to modify a differential group delay (DGD) in each channel so as to produce an output with modified WDM channels; and controlling said DGD to reduce an overall signal fading in said output caused by polarization-mode dispersion (PMD) on all of said channels without separately compensating PMD in each channel.

18. The method as in claim 17, further comprising:

measuring power of an AC portion of said output; and modifying the DGD to increase said power.

\* \* \* \* \*

UNITED STATES PATENT AND TRADEMARK OFFICE
CERTIFICATE OF CORRECTION

PATENT NO.    : 6,603,890 B2
DATED         : August 5, 2003
INVENTOR(S)   : Reza Khosravani et al.

It is certified that error appears in the above-identified patent and that said Letters Patent is hereby corrected as shown below:

<u>Column 1,</u>
Line 9, before "BACKGROUND" please insert the following:
    -- STATEMENT AS TO FEDERALLY-SPONSORED RESEARCH
 This invention was made with government support under Contract No. F30602-98-1-0196 awarded by the Air Force. The government has certain rights in the invention. --

Signed and Sealed this

Second Day of December, 2003

JAMES E. ROGAN
*Director of the United States Patent and Trademark Office*